United States Patent
D'Hooren

[11] Patent Number: 6,096,251
[45] Date of Patent: Aug. 1, 2000

[54] METHOD AND APPARATUS FOR THE MANUFACTURE OF A MULTILAYERED OBJECT

[75] Inventor: Jean-Jacques D'Hooren, Gondecourt, France

[73] Assignee: Plastic Omnium Auto Interieur, Lyons, France

[21] Appl. No.: 09/038,556

[22] Filed: Mar. 11, 1998

Related U.S. Application Data

[63] Continuation-in-part of application No. 08/578,578, Dec. 22, 1995, abandoned.

[51] Int. Cl.[7] ............................ B29C 45/14; B29C 45/16; B28B 7/14
[52] U.S. Cl. ..................... 264/163; 264/257; 264/266; 264/267; 425/112; 425/292; 425/296
[58] Field of Search ........................ 264/161, 163, 264/267, 266, 257, 295, 296; 425/112, 292, DIG. 5, 296, 298, 299

[56] References Cited

U.S. PATENT DOCUMENTS

| | | | |
|---|---|---|---|
| 1,549,961 | 8/1925 | Buckbee | 264/163 |
| 2,733,493 | 2/1956 | Bryer | 264/161 |
| 2,796,634 | 6/1957 | Chellis | 264/163 |
| 2,797,179 | 6/1957 | Reynolds et al. | 264/163 |
| 4,104,349 | 8/1978 | Hillgenberg | 264/161 |
| 4,243,456 | 1/1981 | Cesano | 264/161 |
| 4,495,125 | 1/1985 | Hatakeyama et al. | 264/266 |
| 4,873,041 | 10/1989 | Masui et al. | 264/266 |
| 4,873,045 | 10/1989 | Fujita et al. | 264/257 |
| 4,968,474 | 11/1990 | Ito | 264/266 |
| 5,034,076 | 7/1991 | Masui et al. | 264/266 |
| 5,139,604 | 8/1992 | Mitchell | 156/479 |
| 5,154,872 | 10/1992 | Masue et al. | 264/266 |
| 5,209,880 | 5/1993 | Miwa | 264/163 |
| 5,223,201 | 6/1993 | Masui et al. | 264/163 |
| 5,238,640 | 8/1993 | Masui et al. | 264/266 |
| 5,352,397 | 10/1994 | Hara et al. | 264/153 |
| 5,354,397 | 10/1994 | Miyake et al. | 156/77 |
| 5,395,580 | 3/1995 | Morita et al. | 264/266 |
| 5,593,631 | 1/1997 | Hara et al. | 264/266 |
| 5,622,667 | 4/1997 | Fujiyama et al. | 264/266 |
| 5,672,309 | 9/1997 | Masui et al. | 264/257 |
| 5,679,301 | 10/1997 | Miklas et al. | 264/161 |
| 5,759,594 | 6/1998 | Masui et al. | 264/163 |
| 5,811,053 | 9/1998 | Ota et al. | 264/266 |

FOREIGN PATENT DOCUMENTS 2195940  4/1988  United Kingdom.

*Primary Examiner*—Jan H. Silbaugh
*Assistant Examiner*—Dae Young Lee
*Attorney, Agent, or Firm*—Harrison & Egbert

[57] ABSTRACT

A process for manufacturing a multilayered object by molding having the steps of placing a lining sheet in a mould, injecting a thermoplastic resin material beneath the lining sheet, distributing the thermoplastic resin material beneath the lining sheet to form at least one thermoplastic resin based inner layer by creating a reserve of the thermoplastic resin material in a peripheral portion of the object, holding the extending portion of the sheet in place on the mold during the step of injecting and after the step of injecting so as to retain peripheral tightness of the thermoplastic resin material on a sliding holding point on the punch during movement of the die, pressing the extending portion of the lining sheet against the mold, and sandwiching the reserve in a liquid state between the lining sheet and a portion of the mold until the injected resin material sets to thereby form the multilayered object. The extending portion remains hanging in relation to the punch during the holding of the extending portion.

4 Claims, 3 Drawing Sheets

METHOD AND APPARATUS FOR THE MANUFACTURE OF A MULTILAYERED OBJECT

RELATED APPLICATIONS

The present application is a continuation-in-part of U.S. patent application Ser. No. 08/578,578, filed on Dec. 22, 1995, entitled "METHOD FOR THE MANUFACTURE OF A MULTILAYERED OBJECT", now abandoned.

TECHNICAL FIELD

The invention relates to a process for the manufacture of a multilayered object by moulding and to a mould for the manufacture of such an object permitting the implementation of the manufacturing process.

BACKGROUND ART

There are known various processes for moulding, by injection, permitting the production of objects having at least one thermoplastic resin based inner layer covered with a lining sheet of thermoplastic or textile material.

In particular, there is known a technique for injection-compression moulding and, in this case, in a mould of matching shape, there is held in place a sheet of thermoplastic, or textile, material, generally referred to as a "skin", which will form the outer face of the object. Then, into the partially open mould, thermoplastic resin is injected beneath the so-called "skin" to form the inner layer of the object. This layer will impart volume and stiffness to the object, as well as a certain measure of strength.

Given the characteristics of these moulding processes, the "skin" is thus integral with one of the faces of the inner layer of the object and extends beyond this surface to permit a complementary finishing step.

In this process, the object is re-processed manually by an operator, who will coat the peripheral portion of the projecting skin with glue, once a degreasing step has been carried out. Then, the operator will press the skin against the lower portion of the inner layer in order to "tuck in" the object. Finally, the excess portions of skin are cut off, also manually, in a third step.

Such an injection-compression moulding technique is of interest as it is possible to obtain remarkable aesthetic effects while, at the same time, using materials enabling an acceptable cost to be achieved.

However, it should be noted that the manual reprocessing steps of tucking in and cutting greatly increases the cost.

The object of the present invention is to provide a process for the manufacture of a multilayered object by moulding, the object having at least one thermoplastic resin based inner layer, covered with a lining sheet, of thermoplastic or textile material, which enables the aforementioned drawbacks to be overcome and which avoids, in particular, manual re-processing operations to finish the object by permitting automatic tucking in at the time of manufacture.

The process according to the present invention makes it possible, at the end of the stage of traditional manufacture of a multilayered object by moulding, to fold back the extending portion of the lining sheet beneath the object and, if applicable, to allow the excess material to be cut off.

A further object of the present invention is to provide a mould for manufacturing such a multilayered object permitting implementation of the manufacturing process according to the present invention, which makes use of means for avoiding subsequent manual re-processing of the multilayered object and, in the moulding stage, permits the automatic tucking in and/or peripheral cutting off of the excess lining sheet.

Another object of the present invention is to provide a process and a mould for manufacturing such a multilayered object that can be implemented during low pressure injection moulding or during injection-compression moulding.

Further objects and advantages of the present invention will emerge in the course of the following description which is only provided, however, for illustrative purposes and is not intended to limit the invention.

SUMMARY OF THE INVENTION

The present invention is a process for the manufacturing of a multilayered object by moulding. The object has at least one thermoplastic resin based inner layer covered with a lining sheet of thermoplastic or textile material. The process includes the steps of: (1) placing the lining sheet in a mould; (2) injecting a thermoplastic resin material beneath the lining sheet; (3) distributing the thermoplastic resin material beneath the lining sheet to form at least one thermoplastic resin based inner layer by creating a reserve of the thermoplastic resin material in a peripheral portion of the object; (4) holding the extending portion of the sheet in place on the mould during the step of injecting and after the step of injecting so as to retain peripheral tightness of the thermoplastic resin material on a sliding holding point on the punch during movement of the die; (5) pressing the extending portion of the lining sheet against the mould; and (6) sandwiching the reserve in a liquid state between the lining sheet and a portion of the mould until the injected resin material sets to form the multilayered object. The mould is equipped with a punch and a die so that the lining sheet at least partially extends in relation to the mould so as to have an extending portion hanging in relation to the punch. The extending portion remains hanging in relation to the punch during the holding of the extending portion of the sheet.

The process of the present invention further includes the step of cutting off an excess of the lining sheet prior to removing the object from the mould. The step of holding is carried out with a controlled pressure. A constant clearance is set between the die and the punch.

The present invention is also a mould for manufacturing the multilayered object comprising a die and a punch cooperating to impart to the object a desired configuration. The die is suitable for receiving the lining sheet extending at least partially in relation to the mould with an extending portion hanging at least partially in relation to the punch. A means is provided for creating a reserve of thermoplastic resin material in a peripheral portion of the object. A means is also provided for pressing the extending portion of the lining sheet against the mould so as to sandwich the reserve in a liquid state between the lining sheet and a portion of the mould. This means for pressing includes a slidable and retractable pushrod having a movement which is coordinated with a movement of the die relative to the punch. The pushrod generally matches a shape of the mould. The pushrod presses on the extending portion of the lining sheet during and after injection of the thermoplastic resin material to achieve a peripheral tightness for the resin at a slidable holding point on the punch during the movement of the die of the mould. This extending portion remains hanging with respect to the punch. A means is provided for cutting off an excess portion of the lining sheet prior to removal of the object from the mould. The means for cutting can also be the means for pressing. The pushrod is actuated by a first jack member and presses on a cam member. A portion of the profile of the pushrod corresponds to a portion of the profile of a periphery of the object. The means for cutting includes a cutter-holder slide actuated by a jack member. A sliding plane of the cutter-holder slide corresponds to a lower plane of the die. A cutting line of the cutter-holder slide corresponds to a plane of pressure of the pushrod and to an anvil member opposite a cutter fixed on the punch.

This being the case, the present invention will be more clearly understood from a study of the following description accompanied by the annexed drawings, which form an integral part thereof.

DETAILED DESCRIPTION OF THE INVENTION

The invention relates to a process for manufacturing a multilayered object by moulding, as well as to a mould for the manufacture of such an object, permitting the implementation of the process.

Although particularly developed in the context of the automotive industry, the present invention will apply to all types of objects produced by the moulding of plastic material.

The process according to the present invention will be appreciated from a study of FIGS. 1a to 1e, which schematically represent the moulding principle of the present invention. The mould has a male part 1, or punch, and a female part 2, or die, which are in mating relationship and which together cooperate to give the object its shape. By way of example, the object can assume all manners of different shapes, such as dashboards and/or lining or cladding elements for vehicle bodywork.

The process makes use of the technique known as "injection-compression", which involves a lining sheet 3 which is of thermoplastic or textile material, and a thermoplastic resin suitable for forming the inner layer 4 of the object.

Figure 1A:
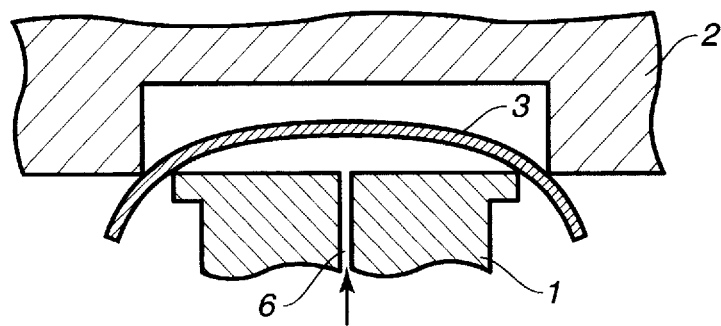
FIGS. 1a to 1e schematically represent the different steps in the process for manufacturing a multilayered object by moulding according to the present invention.
Figure 1B:
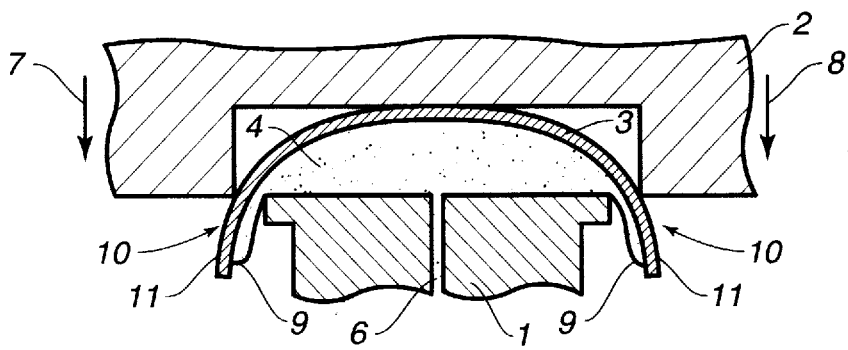
Figure 1C:
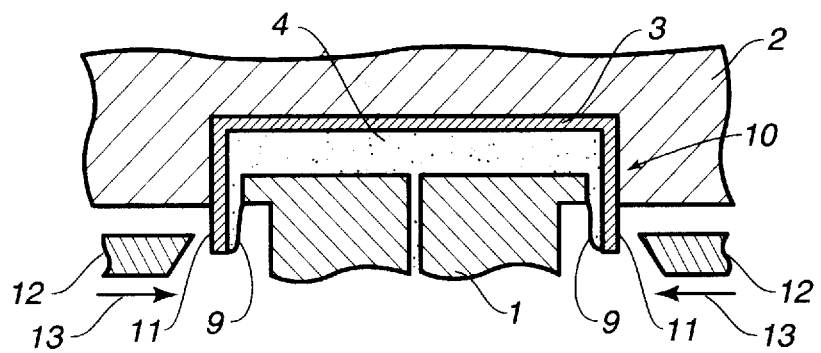
Figure 1D:
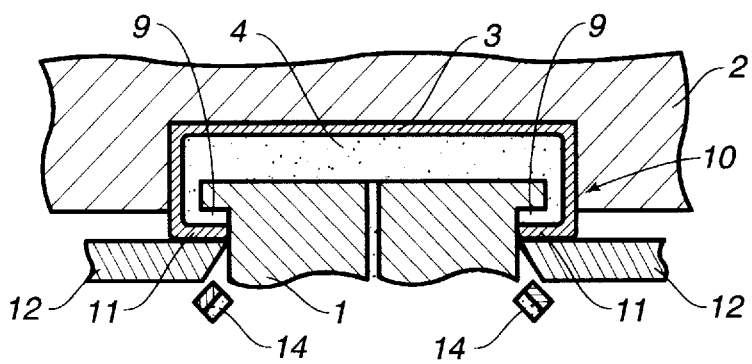
Figure 1E:
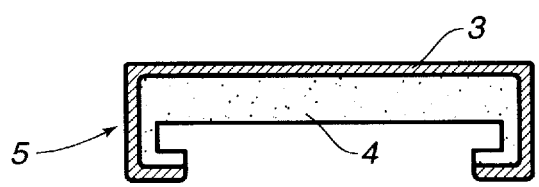

In this respect, the final product 5, removed from the mould in FIG. 1e, has the inner layer 4 covered with the lining sheet 3.

As shown in FIG. 1a, the lining sheet 3 is placed in the mould, in particular between the punch 1 and the die 2, so as to extend, at least partially, in relation to the mould and, in particular, in relation to punch 1.

FIG. 1b schematically represents the phase during which the thermoplastic resin 4 is injected beneath the lining sheet 3 for forming the inner layer. Injection is carried out via one or more channels 6 disposed and distributed, according to the shape of the object to be obtained, in punch 1.

At the end of the injection phase, as suggested by arrows 7 and 8 in FIG. 1b, die 2 is brought towards punch 1, or vice versa, in order to spread the thermoplastic resin beneath lining sheet 3 to form the inner layer 4, creating a reserve 9 of thermoplastic resin in the peripheral portion 10 of the object.

The automatic tucking in step is illustrated in FIG. 1c. Here, the extending portion 11 of lining sheet 3 is pressed against the mould and, in particular, punch 1, so as to sandwich the reserve 9 between lining sheet 3 and a portion of mould 1 until the resin 4 sets.

The pressing of the extending portion, as specified hereabove, is permitted by the means 12 travelling in the direction of the arrows 13. This means will be described later in connection with the mould.

At the end of this stage, it is further possible to cut off the excess 14 of the lining sheet 3. This is effected prior to removing object 5 from the mould.

These schematically represented stages in the process can be implemented in a manufacturing mould such as the one illustrated in FIGS. 2 to 5. For easier understanding, the same reference numbers as previously used will be employed in these figures to refer to the same members or elements.

It can be seen that die 2 is on the upper portion of the mould. Punch 1 is on the lower portion of the mould. Lining sheet 3 is disposed between punch 1 and the die 2 when the mould is partially open.

As indicated above, the sheet is disposed with an extending portion 11 at least partially hanging in relation to punch 1.

This being the case, there is provided means for creating a reserve 9 of thermoplastic resin in the peripheral portion 10 of the object, as mentioned earlier.

The reserve 9 can be formed naturally under the extending portion 11 of lining sheet 3 because of the viscosity of the resin and the adhesiveness of the inner face of lining sheet 3 opposite the resin. It is also because of a clearance provided between the side of punch 1 and the female portion of die 2. This is illustrated, in particular, in FIG. 1c.

Figure 4:
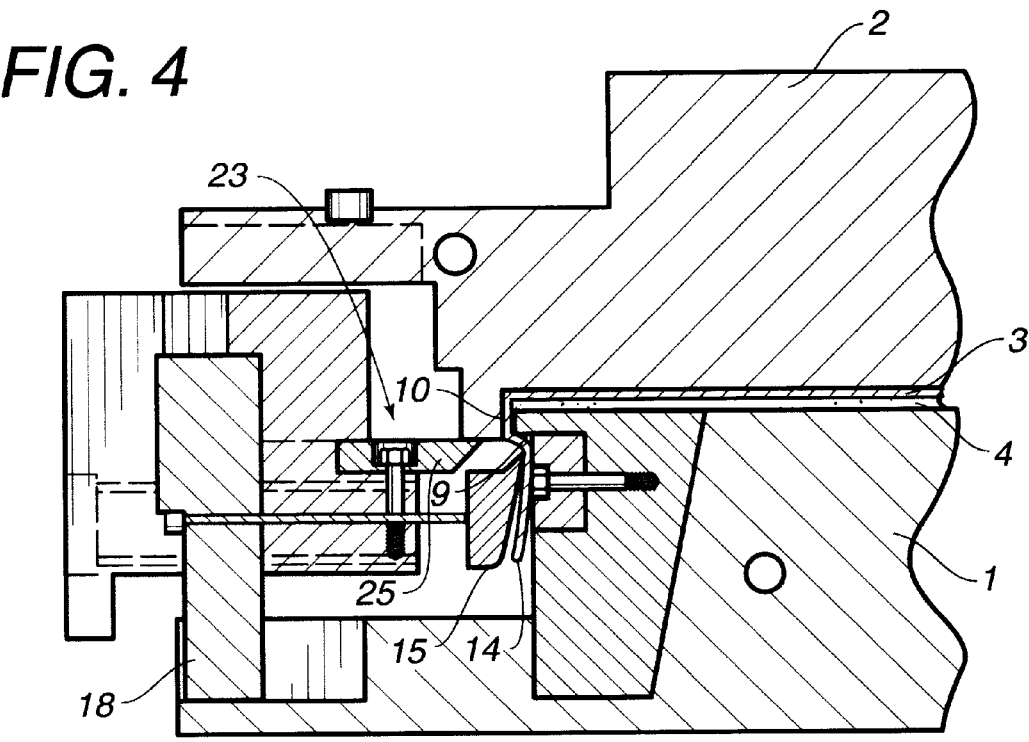
FIG. 4 shows the mould of FIG. 2 in a compression stage.

According to another variation of the present invention, the reserve is produced by regulating the lining sheet via the means for pressing the extending portion of the sheet against the mould. This is illustrated in FIGS. 2 and 4.

These means are formed by a pushrod 15 which is slidable and retractable. The movements of the pushrod 15 are coordinated with the relative movement of die 2 in respect of punch 1, or vice versa. The movements of the pushrod 15 match the shape of the mould and, in particular, of punch 1.

Figure 2:
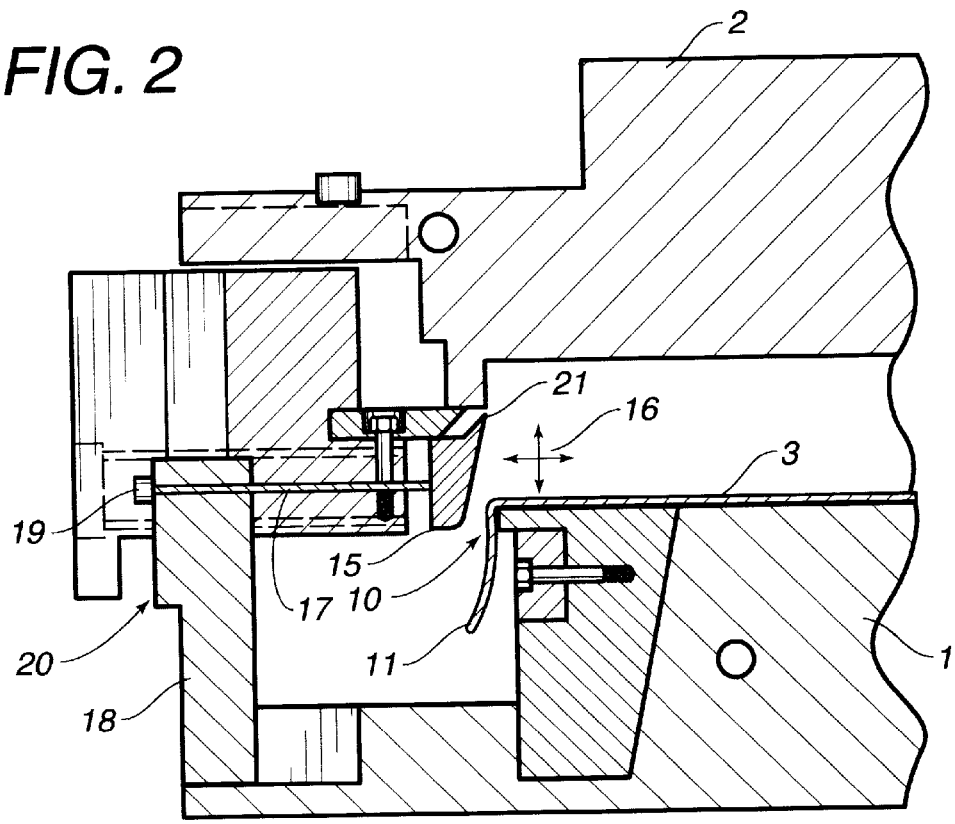
FIG. 2 shows a partial cross-section of a manufacturing mould according to the present invention, the die and the punch being partially open.

As shown in FIG. 2, pushrod 15 is connected to die 2 and capable of moving downwards and from left to right, and vice versa, as schematically represented by arrows 16 associated with the pushrod.

Without going into a detailed mechanical discussion of the design of pushrod 15, it should be said that it is borne by a rod 17 and is actuated by a first jack member, not shown in the figures.

This being the case, a cam member 18, integral with punch 1, is provided for controlling the horizontal movement of pushrod 15. More specifically, cam member 18 has a profile matching that of the periphery of the to-be-produced object. Pushrod 15 is guided over this cam member 18 by a stop 19 capable of sliding vertically and horizontally to follow the profile of the cam member 18.

In FIG. 2, it should be noted that the portion numbered 20 of the cam member 18 corresponds to the peripheral portion 10 of the object.

Figure 3:
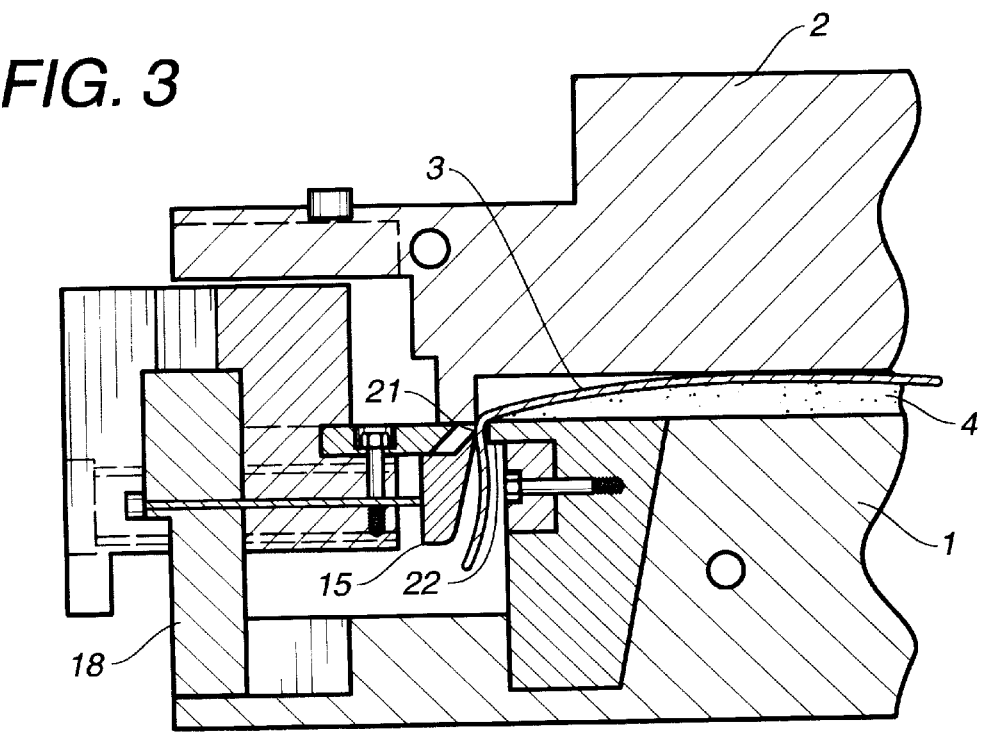
FIG. 3 shows the mould illustrated in FIG. 2 in the stage wherein the thermoplastic resin is injected beneath the lining sheet.

When die 2 moves down towards punch 1, pushrod elements 15, 17 and 19 slide downwards in relation to cam 18, as illustrated in FIG. 3. In this case, end 21 of the pushrod 15 comes into contact with the plane of seal 22 of punch 1, in order for lining sheet 3 to be sandwiched between these two portions.

When pushrod 15 presses on cam 18, it is advantageous to keep a constant, adjustable clearance between the die and the punch. This clearance is intended for clamping the lining onto the mould and thereby ensuring tightness during the crushing of the thermoplastic resin. Furthermore, the pushrod 15, by mating with the profile of the cam member 18, ensures both tightness and tucking in, as illustrated in FIG. 4.

Thus, according to the present invention, extending portion 11 of the sheet is pressed on mould 1, advantageously during injection of the resin, and after injection, so as to ensure peripheral tightness for the resin.

This holding action can be performed, furthermore, using controlled pressure in order to be able, during the injection stage, to form the reserve 9, as illustrated in FIG. 4.

FIG. 3 schematically represents the stage in which the resin 4 is injected under skin 3. The extending portion 11 is held in place by pushrod 15 during injection.

FIG. 4 shows the compression stage, during which the injected thermoplastic resin 4 will be distributed under lining sheet 3. This is carried out at the time of closure of the mould, more precisely, at the time of moving die 2 onto punch 1.

It should be noted that, under these conditions, and because of the pressing means 15, it will be possible to create the reserve 9 of resin in the peripheral portion 10 of the object. In this case, the holding action is effected during the displacement of the mould punch, the holding point then sliding on the punch. As such the extending portion 11 of the lining sheet 3 is held in place on the mould so as to retain peripheral tightness of the thermoplastic resin according to this sliding holding point on the punch 1 during movement of the die 2.

Thus, the automatic tucking in operation permitted by the adhesion of the lining to the thermoplastic resin in a liquid state is carried out during the object shaping stage.

Figure 5:
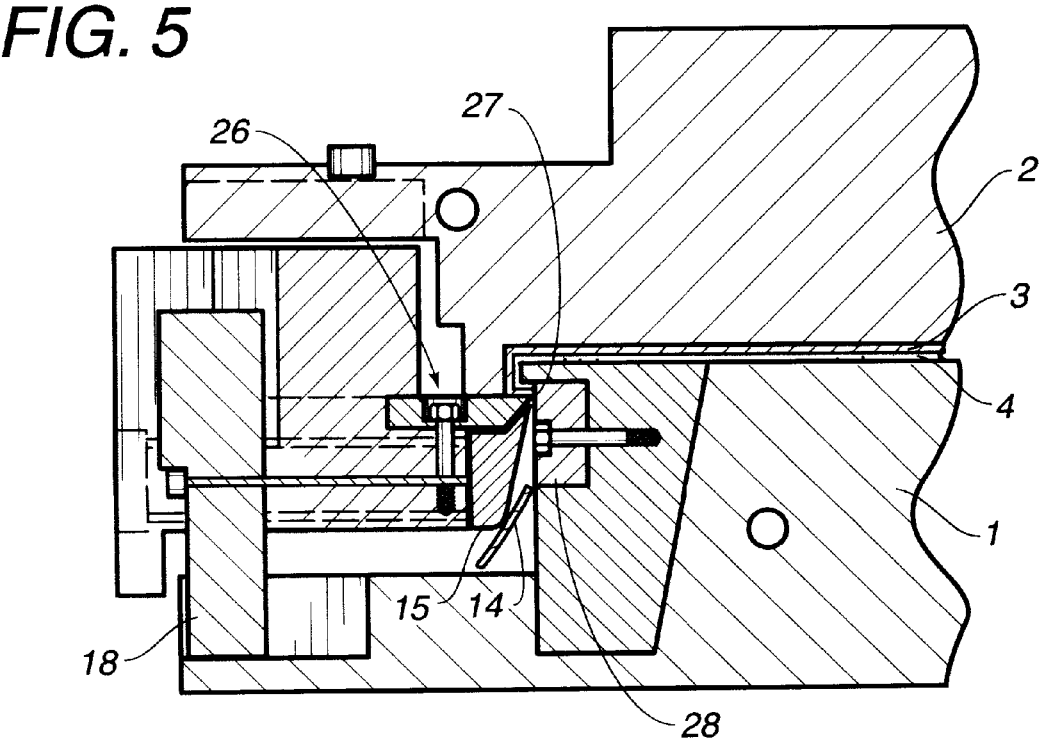
FIG. 5 shows the last stage in the process according to the present invention implemented in the mould illustrated in FIG. 2.

After this stage, and after the resin has set, the excess 14 can be cut off the lining sheet prior to removing the object 5 from the mould. This is illustrated in FIG. 5. For this purpose, the mould according to the present invention further comprises cutting means 23 permitting this operation.

More precisely, the cutting means 23 takes the form of a cutter-holder slide 25, actuated by a second jack member, not shown in the figure. The sliding plane of the cutter-holder slide 25 which corresponds to the lower plane 26 of die 2. The cutting line 27 corresponds to the plane of application of the pushrod 15.

Furthermore, the cutting means 23 comprises an anvil member 28. Thus, after the injection-compression stage, during which pushrod 15 is held in place, cutter-holder slide 25 is pressed against anvil 28 to cut off the excess 14.

It should be noted that, in the simplified form of embodiment shown in FIG. 1, the cutting means also constitute the means for pressing the extending portion of the lining sheet against the mould, as described hereabove.

After a time delay to permit complete cutting of the lining, the cutter-holder slide 25 retreats to its initial position. A position switch comes to bear on the rear of the pushrod and gives the message "pushrod retracted and cutter-holder slide retracted", which then makes it possible to open the mould and remove the object.

The foregoing disclosure and description of the invention is illustrative and explanatory thereof. Various changes in the details of the illustrated apparatus may be made within the scope of the appended claims without departing from the true spirit of the invention. The present invention should only be limited by the following claims and their legal equivalents.

I claim:

1. A process for manufacturing a multilayered object by moulding, the object having at least one thermoplastic resin based inner layer covered with a lining sheet of thermoplastic or textile material, the process comprising the steps of:

placing the lining sheet in a mould, the mould having a punch and a die, the lining sheet positioned between a face of the punch and the die, the lining sheet having a portion extending outwardly beyond a space between an outer periphery of the punch and an inner periphery of the die to have the portion hanging in relation to the punch;

injecting a thermoplastic resin material into the mould beneath the lining sheet;

displacing the punch into the die to distribute the thermoplastic resin material beneath the lining sheet by compression to form the thermoplastic resin based inner layer;

pressing the portion of the lining sheet against the punch and creating a reserve of the thermoplastic resin material between the portion of the lining sheet and the outer periphery of the punch;

holding the portion of the lining sheet on a sliding holding point on the outer periphery of the punch during the displacing of the punch into the die so as to retain peripheral tightness of the thermoplastic resin material during the step of injecting and after the step of injecting, the portion remaining hanging in relation to the punch during the step of holding;

sandwiching the reserve in a liquid state between the lining sheet and the outer periphery of the punch until the injected resin sets to thereby form the mulitlayered object.

2. The process according to claim 1, further comprising the step of:

cutting off an excess of the lining sheet prior to removing the object from the mould.

3. The process according to claim 1, wherein said step of holding is carried out with a controlled pressure.

4. The process according to claim 1, further comprising the step of:

setting a constant clearance between the inner periphery of the die and the outer periphery of the punch.

* * * * *